(12) United States Patent
Schwarze (10) Patent No.: US 9,517,493 B2
(45) Date of Patent: Dec. 13, 2016

(54) BELT STRIPPER WITH ANGLE HEIGHT ADJUSTMENT AND METHOD FOR ADJUSTING SAID BELT STRIPPERS

(71) Applicant: Hans-Otto Schwarze, Recklinghausen (DE)

(72) Inventor: Hans-Otto Schwarze, Recklinghausen (DE)

(73) Assignee: Hans-Otto Schwarze, Recklinghausen (DE)

( * ) Notice: Subject to any disclaimer, the term of this patent is extended or adjusted under 35 U.S.C. 154(b) by 0 days.

(21) Appl. No.: 14/759,251

(22) PCT Filed: Jan. 7, 2014

(86) PCT No.: PCT/EP2014/000011
§ 371 (c)(1),
(2) Date: Jul. 6, 2015

(87) PCT Pub. No.: WO2014/106621
PCT Pub. Date: Jul. 10, 2014

(65) Prior Publication Data
US 2016/0001329 A1    Jan. 7, 2016

(30) Foreign Application Priority Data

Jan. 7, 2013  (DE) .................. 10 2013 000 039
Apr. 22, 2013  (DE) .................. 10 2013 006 821

(51) Int. Cl.
*B65G 45/16* (2006.01)
*B08B 1/00* (2006.01)

(52) U.S. Cl.
CPC ............... *B08B 1/005* (2013.01); *B65G 45/16* (2013.01)

(58) Field of Classification Search
CPC ........................................................ B65G 45/16
USPC ........................................................ 198/499
See application file for complete search history.

(56) References Cited

U.S. PATENT DOCUMENTS

| | | | |
|---|---|---|---|
| 4,529,084 A | 7/1985 | Zhang | |
| 5,082,106 A | 1/1992 | Schwarze | |
| 5,518,107 A | 5/1996 | Schwarze | |
| 5,950,803 A * | 9/1999 | Schwarze | B65G 45/16 198/499 |
| 8,485,344 B1 * | 7/2013 | Liland | B65G 45/16 198/499 |
| 2001/0054538 A1 * | 12/2001 | Finger | B65G 45/16 198/499 |
| 2002/0125106 A1 * | 9/2002 | Hall | B65G 45/16 198/499 |

(Continued)

FOREIGN PATENT DOCUMENTS

| | | |
|---|---|---|
| DE | 3620960 | 1/1988 |
| EP | 0090985 | 8/1986 |

(Continued)

OTHER PUBLICATIONS

International Search Report for PCT/EP2014/000011, English translation attached to original, Both completed by the European Patent Office on Jun. 2, 2014, 6 Pages.

*Primary Examiner* — James R Bidwell
(74) *Attorney, Agent, or Firm* — Brooks Kushman P.C.

(57) ABSTRACT

A belt stripper module for a stripping device for the return region of conveyor belts, which module is mounted as one of a plurality on a height-adjustable system carrier.

15 Claims, 6 Drawing Sheets

(56) References Cited

U.S. PATENT DOCUMENTS

| | | | | |
|---|---|---|---|---|
| 2008/0053791 A1* | 3/2008 | Swinderman | .......... | B65G 45/16 |
| | | | | 198/499 |
| 2010/0206695 A1* | 8/2010 | Schwarze | .............. | B65G 45/16 |
| | | | | 198/499 |

FOREIGN PATENT DOCUMENTS

| | | |
|---|---|---|
| EP | 0450133 | 10/1991 |
| EP | 0254977 | 4/1992 |
| EP | 0629171 | 4/1998 |

* cited by examiner

BELT STRIPPER WITH ANGLE HEIGHT ADJUSTMENT AND METHOD FOR ADJUSTING SAID BELT STRIPPERS

CROSS-REFERENCE TO RELATED APPLICATION

This application is the U.S. national phase of PCT Application No. PCT/EP2014/000011 filed on Jan. 7, 2014, which claims priority to DE Patent Application No. 10 2013 000 039.4 filed on Jan. 7, 2013 and DE Patent Application No. 10 2013 006 821.5 filed on Apr. 22, 2013, the disclosures of which are incorporated in their entirety by reference herein.

The invention relates to a belt-stripper system made up of modules for the return region of conveying belts, wherein the belt-stripper system comprises an adjustable, fixed or resiliently mounted system carrier, in a direction transverse to the running direction of the belt, and a number of stripping modules, which are retained one beside the other on the carrier. The stripping modules each carry a stripping lamella, which butts with peeling action against the belt, and are pushed resiliently onto the belt. Corresponding belt-stripper systems form tried-and-tested prior art, EP 254 977 B1 being mentioned here by way of example.

The known belt-stripper systems are used for a wide variety of conveyable articles under widely differing conveying conditions. They always have to operate reliably even in the case of rapidly changing properties, for example outdoors with rain setting in, and remotely from workshop sites, for example in the recovery of raw materials, long service lives being required. Stoppage periods should be kept as short as possible, since stoppages in production usually incur high follow-up costs.

These requirements are met by modular construction. Conventional modules, as are described by way of example in EP 254 977 B1 and DE-A 36 20 960, have:
- a base, which is fastened on one of the system carriers,
- a cutting-edge carrier, on which a stripping lamella is fitted,
- a stripping edge, which is fitted on the stripping lamella, and a stripping body with
  - a bushing, in which the cutting-edge carrier is mounted in a rotatable manner, and
  - an articulation with a torsion spring, which connects the base and stripping body.

Long service lives are also achieved by the stripping lamellae having wear-resistant carbide cutting edges which wear down very slowly by abrasion, a razor-sharp cutting edge being the result. This razor-sharp carbide cutting edge gives rise to considerable problems with interruptions to operation and with the implementation of maintenance tasks.

Once a belt-conveying installation has been switched off, the conveying belt can often be seen to run back a little, this being caused for example by the conveying belt, which expands elastically during operation, contracting again when the installation is at a standstill. Depending on the installation, the resulting unavoidable return travel may amount to a number of meters. It is possible here for the carbide edge to be drawn into the belt, which, on account of the carbide edge being razor-sharp, results in the belt being damaged. For maintenance purposes, the situation where the carbide edge cuts in during the carrier being installed and removed should likewise be avoided, which renders adjustment difficult.

In the case of belt defects or deposits during operation, the belt stripper in the first instance springs away from the belt, and then the belt stripper springs back onto the belt, it being necessary for this spring-back operation to take place very precisely. It is a technical problem here that the belt stripper and the stripping lamella have to be configured such that, throughout the wear period, the adjustments initially carried out on the belt-stripper system remain unchanged in practical terms, to be precise in respect of all conceivable operational and loading situations.

At the latest once the carbide cutting edge is completely worn out, the modules have to be changed over for new ones. If this maintenance deadline is exceeded, the cutting-edge carrier is subjected to rapidly progressing wear until, ultimately, it is only the arms of the cutting-edge carriers which butt against the belt. On the basis of a pronounced increase in the surface-area pressure or the formation of sharp edges, this can result in the belt being damaged.

For the purpose of installing strippers within and beneath the belt conveyors, safety regulations prohibit work from being carried out without special protective measures. Therefore, it should be possible for strippers to be installed from the outside and for the necessary precision adjustment of the modules on an uneven belt to be carried out likewise outside the belt framework.

It is therefore an object of the invention to provide a straightforward and cost-effective apparatus which solves the abovedescribed problems and can be installed quickly and straightforwardly. The intention is thus for the invention to create a stripper which, while being of extremely straightforward modular construction, gives rise to the best possible cleaning performance, and is very straightforward to install, that is to say without any specialist skill being required, wherein the operation of installing the stripper should take place only from outside the framework structure and the operation of changing over the modules, when stripping edges are worn, takes place likewise only from outside the framework structure. The stripper should operate without any maintenance being required until the carbide edges are completely worn out. Return travel of the belt, as often occurs for various reasons, has to be possible without the stripper or belt being damaged. The stripper has to have a device by means of which it is possible to measure belt unevennesses, in order thus to adapt the modules to the unevennesses by way of height adjustment. The stripper should be kept largely free of material deposits, which impair the function of the apparatus.

The invention achieves the object by means of a belt-stripper module which is mounted as one of a number of such modules on a height-adjustable system carrier, having
- a base, which is fastened on the system carrier,
- a cutting-edge carrier, on which a stripping lamella is fitted,
  - wherein a stripping edge is fitted on the stripping lamella, and
  - the stripping lamella forms an obtuse angle in relation to the belt, as seen in the running direction,
- a stripping body with an articulation housing having two articulations, in the case of which
  - a first articulation, of which the axis of rotation runs transversely to the running direction of the belt, with a torsion spring, which connects the base and stripping body, the torsion spring here pushing the stripping lamella the belt,
  - a second articulation with a bushing, in which the cutting-edge carrier is mounted in a rotatable manner, the axis of rotation of said second articulation running longitudinally in relation to the running direction of the belt, and said second articulation orienting the cutting-edge carrier on the running belt such that the stripping edge butts always flatly against the belt, a height-adjusting means for the belt-stripper module on the base, wherein the first articulation is provided with a spring-angle-measuring means and with a fixed stop for deflection.

The fixed stop achieves the situation where, following installation on the system carrier, all the stripping edges of the belt-stripper modules are arranged in the first instance in a rectilinear plane. Introducing the fixed stop increases the level to which the belt is safeguarded, since, even if the maintenance deadline is exceeded or if the stripping edges have been subjected to premature wear or have been completely worn out, the belt-stripper module is adjusted only until it reaches said fixed stop and is not pushed any further toward the belt.

The first articulation with the fixed stop, in a preferred configuration of the invention, is configured with a rubber torsion spring with a square socket, on which is fastened a stop disk, which strikes against a stop nose fastened on the articulation housing.

When the stripper is positioned under stressing against an uneven belt, different degrees of prestressing occur on the individual modules. In one configuration of the invention, it is provided that these differences in prestressing are detected by a measuring and sensing mechanism integrated in the respective module, and then the differences in prestressing are compensated for by a module-height-adjusting means.

The measuring and sensing mechanism allows optimum adjustment of the stripper prestressing without work having to be carried out in the chute or beneath the conveying belt. It is thus possible for valid safety regulations to be observed on site without it being necessary to provide for high-outlay (scaffolding) equipment which is necessary in the customary prior art, and this is an advantage of the invention.

In one configuration of the invention, the measuring and sensing mechanism is configured in the form of an integrated spring-angle-measuring means in combination with a ring which is rotatable about the axis of rotation of the first articulation and is positioned concentrically on the first articulation. When the belt stripper swings back, said ring is carried along but, rather than swing back again, remains in the position of the greatest swinging amplitude reached up until that point. It also contains an indicating mechanism, with reference to which it is possible to see, or read off, the rotation which has been achieved in relation to the starting state. The prestressing of the torsion spring can be read off in this way.

In a further configuration of the invention, the measuring and sensing mechanism is configured in the form of an integrated spring-angle-measuring means and a rotatable plastic ring with an arrowhead, which indicates the prestressing of the torsion spring on a scale.

In a further configuration of the invention, the rotatable plastic ring is rotated in relation to a foam disk or a rubber ring, on which it is seated with slight undersizing, and therefore the plastic ring is secured in its deflected position by the friction between the foam disk, or rubber ring, and plastic ring, even when the module is relieved of stressing again.

In a further configuration of the invention, a device for electronic angle-of-rotation measurement is provided on that side of the module on which the arresting means is fitted. Said device may be integrated, for example, in the covering cap. This allows the angle-of-rotation position to be determined, digitized and converted into a signal, wherein the zero position and the end position are known. In a further configuration, the device for electronic angle-of-rotation measurement is provided with a transmitter, by means of which the angle-of-rotation state converted to a signal is transmitted to a receiver located outside the module.

In a further configuration of the invention, the system carrier has fitted on it a receiver which receives the signals transmitted by the modules and evaluates said signals in an evaluation unit. This evaluation unit is preferably operated such that it determines the module which is most worn and is the least advantageous for the remaining operating period, and emits three values: a first value for unrestricted continued operation, a second value for maintenance being required, and a third value for the case where the end stop has been reached and there is no longer any stripping action taking place.

The evaluation unit is advantageously connected to an indicating device. Such an indicating device may be configured, for example, such that a green indicator lights up at the system-carrier end for the first value, an amber indicator lights up for the second value and a red indicator lights up in the third case, and therefore the state of wear can be seen from afar in the manner of a set of traffic lights. Of course, it is also possible for other methods of indication to achieve the same effect. It is also, of course, possible to indicate the digital signal using numbers.

A further configuration provides for the evaluation unit to be provided with a transmitter, by means of which the data or values determined are transmitted to a further-removed service station or a measuring station. Of course, it is also possible to combine the methods of indication.

Once the modules according to the invention are installed on the system carrier, the adjustment operation takes place in the following steps:

1. The stripper is moved toward the belt, by displacement of the system carrier, until the first module is in contact with the belt. All the slave pointers of the angle-measuring device have now been turned back as far as the fixed stop.
2. From this position, the stripper is prestressed by a predetermined amount in relation to the belt by the spindle displacement of the system carrier. The height position of the spindle of the carrier-displacement means is marked.
3. The system carrier with the modules is moved back again from the belt and removed.
4. The positioning of the slave pointers can now be used to show whether all the modules have the optimum level of prestressing.
5. If the prestressing of a module does not correspond to the stipulated requirements, the module is adapted via the height-adjusting means of the base part of the module.
6. Following the height adjustment of the modules, the slave pointers are zeroed again and the stripper is prestressed in relation to the belt again until the position from step 2 (marking) has been reached again.

If necessary, steps 3-6 are repeated again.

The advantages of the invention are as follows:

The angular positioning of the cutting-edge carriers of the modules is uniform following production and is not defined by dimensional and material tolerances of the rubber elements or dimensions of the square structures of the rubber springs.

Following installation on the system carrier, all the stripping edges of the modules are arranged in one plane. This renders adjustment on the belt easier and allows uniform adjustment of the modules. It is possible to measure, and adapt, the spring-stressing angles on all the modules.

During spindle adjustment in relation to the belt, the module, upon initial belt contact, is already inclined a few degrees further rearward. This reduces the risk of the modules jamming as the stripper is subjected to further stressing. This therefore avoids the operation of turning the modules back manually during spindle adjustment.

The maximum amount of wear is limited by the fixed stop. This prevents the situation where, if stripper maintenance is not carried out in good time, the belt can be damaged as a result of modules being subjected to excessive wear.

Upon return movement of the belt, the stripper cannot cut into the belt or get jammed in it.

The invention will be explained in more detail hereinbelow. In FIGS. 1 to 6:

Figure 1:
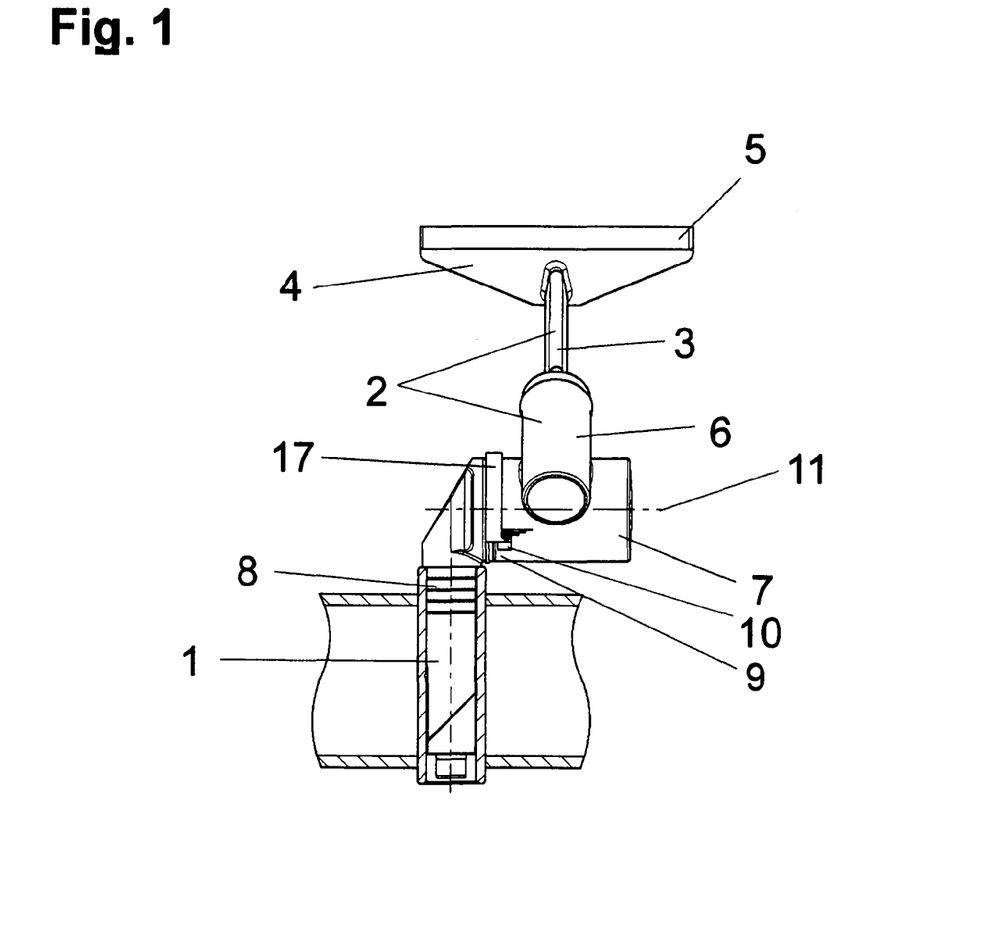
FIG. 1 shows a front view of a module

FIG. 1 shows a front view of the belt-stripper module having a base 1, a stripping body 2 and a cutting-edge carrier 3, on which is fitted a stripping lamella 4, the stripping edge 5 being fastened on the tip of the stripping lamella. The stripping body 2 also contains the bushing 6, in which the cutting-edge carrier 3 is mounted in a freely rotatable manner. The bushing 6 is fixed to the first articulation 7, which is configured in the form of a torsion-spring articulation, and itself forms the second articulation. The bushing 6, which forms the second articulation, and the housing of the first articulation form the stripping body 2. The first articulation is connected to the base 1, which has a height-adjusting means 8. The first articulation has a spring-angle-measuring means 9 and a fixed stop 10 in the form of a driver, which carries along the rotatable plastic ring 17 when the module is subjected to prestressing. The first articulation rotates about the axis of rotation 11.

Figure 2:
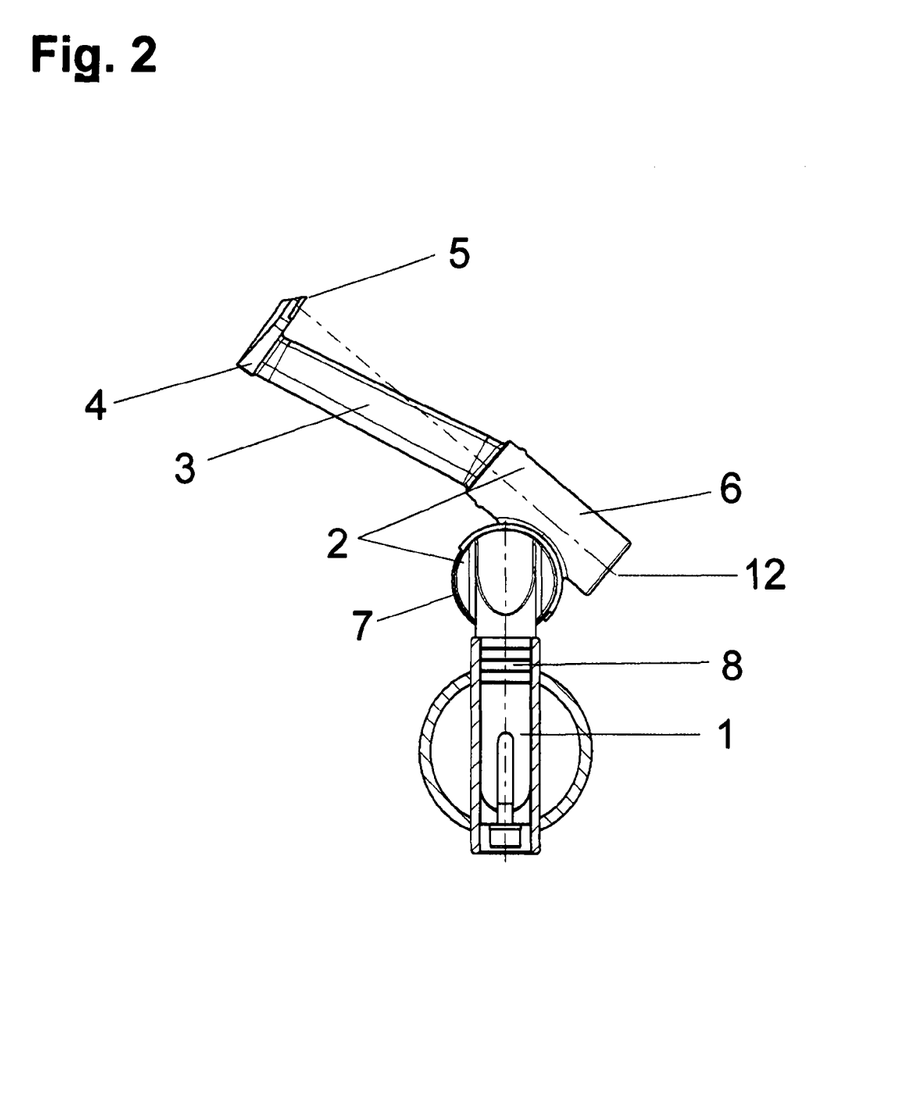
FIG. 2 shows a side view of a module

FIG. 2 shows a side view of the belt-stripper module in FIG. 1, the axis of rotation 12 of the second articulation also being illustrated.

Figure 3:
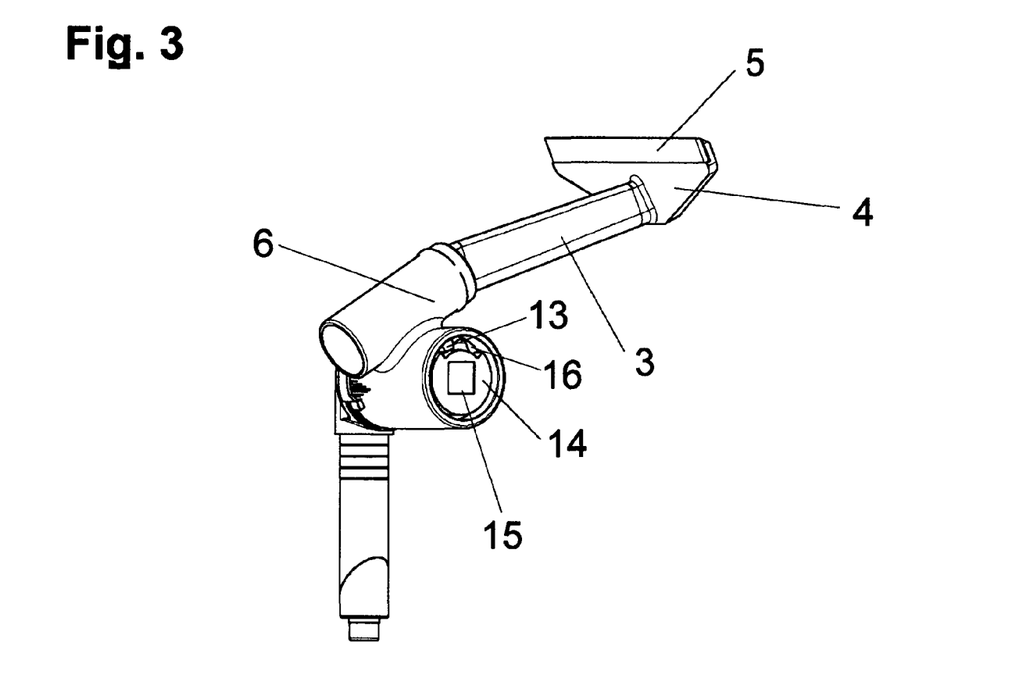
FIG. 3 shows an oblique view of a module with the first articulation open

FIG. 3 shows an oblique view of the belt-stripper module in FIGS. 1 and 2, wherein that side of the first articulation 7 which is located opposite to that in FIG. 2 is shown in an open state. It is possible to see here the stop nose 13, which is fixed to the housing of the first articulation. The abutment is formed by the stop disk 14, which is connected to the square socket 15. The square socket 15 here is fixed and does not rotate along with the stripping body 2. The rubber torsion spring 16, configured in accordance with the known prior art, as described for example in DE-A 36 20 960, can be seen to be indicated in the first articulation. As the stripping lamella 4 is subjected to wear, the cutting-edge carrier 3 moves progressively in the direction of the belt and would damage the latter at the end if there were no fixed stop, in this case formed from a stop nose 13 and stop disk 14, to prevent this.

Figure 4:
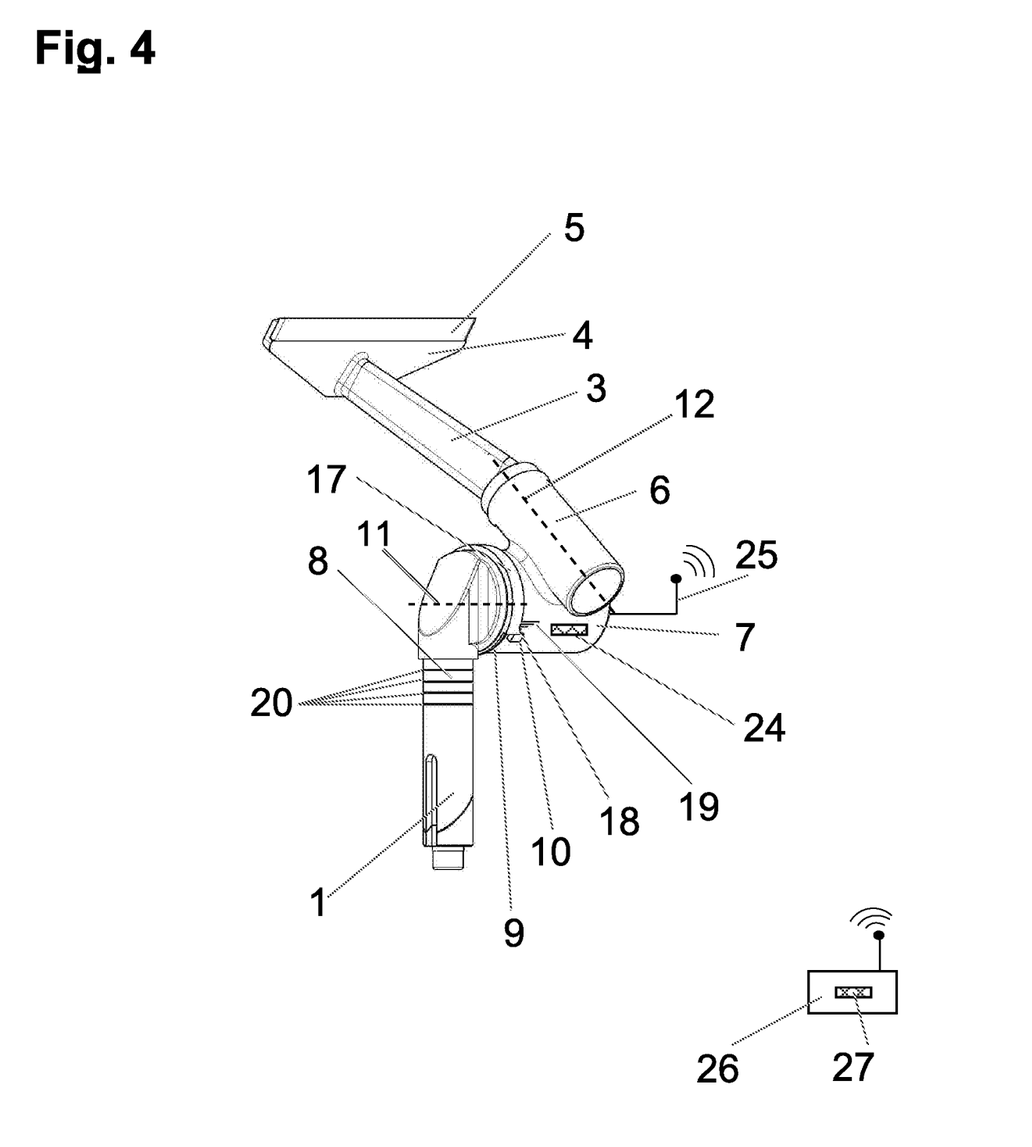
FIG. 4 shows a module with height adjustment and a rotatable plastic ring

FIG. 4 shows an oblique view of the belt-stripper module in FIG. 3, albeit from the other side. It is possible to see here the spring-angle-measuring means 9 and the fixed stop 10. The plastic ring 17 with the arrowhead 18 indicates the prestressing of the torsion spring on the scale 19 following relief from stressing during installation. This prestressing must not be confused with the pressure-exerting force with which the belt stripper is pressed onto the belt during stripping operation. The pressure-exerting force changes as wear increases, as the rubber torsion spring 16 yields somewhat on account of the change in angle and the pressure-exerting force thus decreases correspondingly. The indication of prestressing force is used for installation purposes. During operation, the act of the stripping body 2 yielding from stripping obstructions on the belt causes deflection of the rubber torsion spring 16. Accordingly, the arrowhead 18, rather than continuing to indicate the current level of prestressing, indicates the maximum deflection and thus the maximum pressure-exerting force which has occurred during travel. Account should also be taken of the fact that, in addition to prestressing of the rubber torsion spring, follow-up stressing also takes place as a result of the carrier system traveling upward. The pressure-exerting force is the sum of the prestressing force and of the follow-up stressing minus the drop in stressing as the rubber torsion spring 16 yields as wear takes place.

If the system carrier, which carries the individual belt-stripper modules, is moved back onto the belt from beneath following installation, the belt-stripper modules, once they have reached the belt, spring back, as upward travel progresses, counter to the direction of travel of the belt, said modules butting, and rubbing, against the belt. The prestressing is set at the factory by the stop nose 13 and the selection of the stop disk 14, in the case of which it is possible to vary the geometry of the aperture in relation to the position of the square socket.

The stop disk 14 here has two functions: on the one hand, it limits the deflection of the stripping body 2 in the direction of the belt, in order to prevent damage to the belt once the stripping lamella 4 is worn; on the other hand, the geometry of the stop disk 14 sets the level of prestressing. The fixed stop is realized, in this way, via a stop disk 14 and a stop nose 13, but it is also possible to have other means for achieving the fixed stop according to the invention without departing from the general concept of the invention. This fixed stop must not be confused with the fixed stop 10 of the spring-angle-measuring means 9, the fixed stop 10 being located on the opposite site of the first articulation 7.

Figure 5:
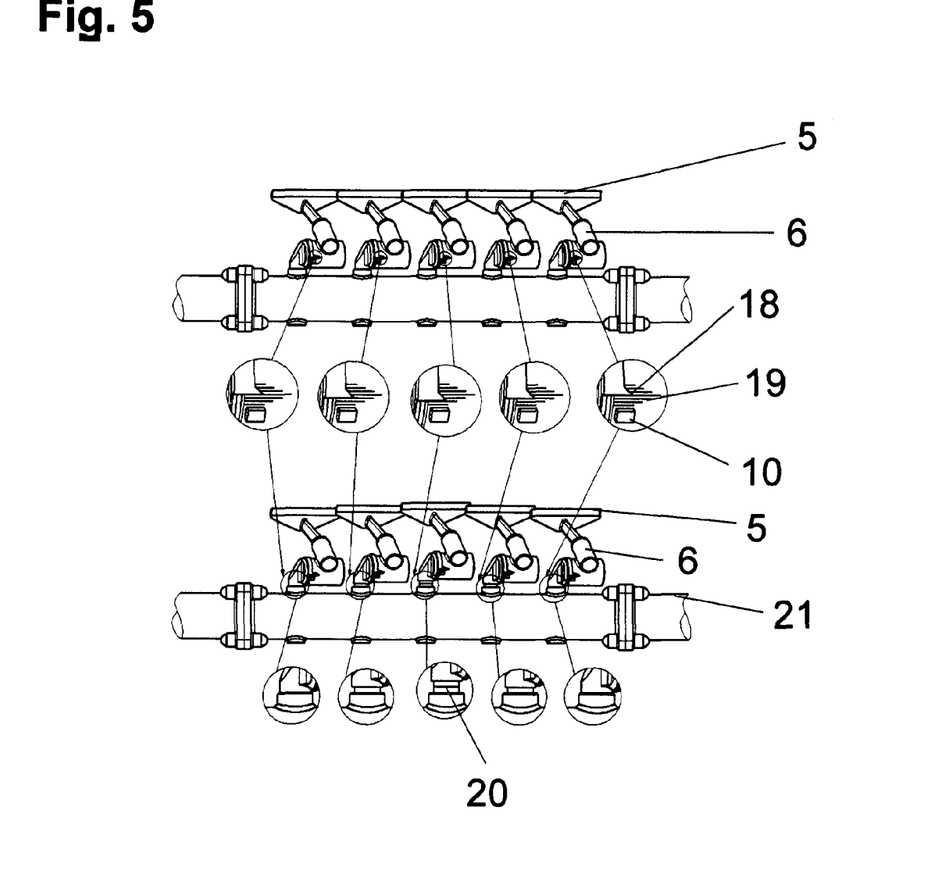
FIG. 5 shows the height adjustment of the belt-stripper modules on a system carrier on the belt.

FIG. 5 illustrates, by way of example, how differences in height of the belt surface are measured and the belt-stripper modules are then adjusted in height in order to achieve the situation where then all the stripping edges butt against the belt with the same predetermined level of pressure. The upper part of the figure shows a stripper with five modules on a system carrier 21, which has already been prestressed and relieved of stressing again. The magnifying glass shows which prestressing marking the arrowhead of the plastic ring is indicating. It is only in the case of the respectively outer modules that the arrowhead is pointing to the fourth and longest marking, which means that these modules have been prestressed to the full extent. The central module has the arrowhead pointing to the second marking, and the remaining two modules have the arrowhead pointing to the third marking. Accordingly, these modules have not been prestressed to the full extent and have to be readjusted in height, each by the difference indicated in relation to the outer module. The arrow of the central module points to the second marking and has to be adjusted upward by two (4−2=2) graduation marks. In the case of the two other modules, the pointers are located on the third graduation mark and each have to be adjusted upward just by one (4−3=1) graduation mark. In the second part of the figure, the stripper is shown with height-adjusted modules. It can clearly be seen that the belt is curved concavely in the operating region of the stripper and the modules have now been adapted to said curvature. The stripper can now be operated and all the modules, in the case of renewed spindle adjustment, will now have the same level of prestressing provided. If required, the accuracy can be easily monitored by the outlined procedure being repeated.

Figure 6:
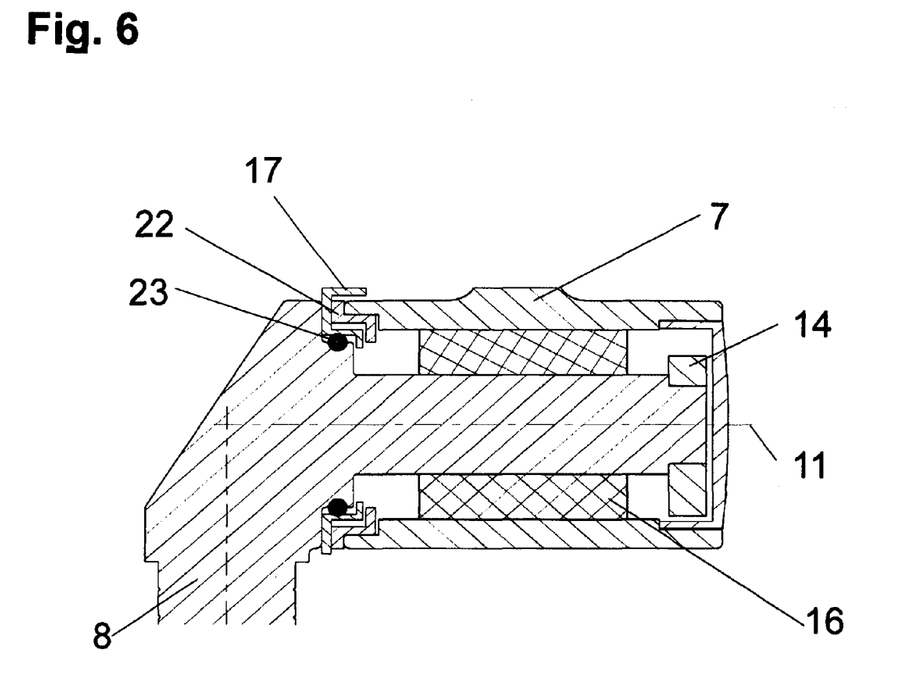
FIG. 6 shows a section with the plastic ring necessary for measuring purposes.

FIG. 6 illustrates how the plastic ring 17, which is necessary for measuring purposes, is fitted on the fixed part of the belt-stripper module. It is pressed, with slight undersizing, onto a rubber ring 23, and therefore, as has already been outlined above, it can be turned by hand just by a moderate amount of force being applied.

The operation of the belt-stripper modules will be described in detail hereinbelow. For this purpose, the belt-stripper modules are prestressed against an inner stop at the factory and delivered to the location of use in this way. It is also possible for the belt-stripper modules to be installed on a system carrier at the factory, but installation at the location of use is likewise possible. Once the new system carrier has been put in place, it is raised upward on spindles in two operations. During the first operation, the system carrier is moved upward until the tips of the stripping edges of a module are just in contact with the belt. If the belt is uneven, it is possible for the individual belt-stripper modules to be individually oriented, and readjusted, such that each has its stripping edge just in contact with the belt, as described above.

Thereafter, in the second operation, the stripper is raised further upward on spindles by an amount given in the installation and operating instructions, for example 20 mm. The displacement spindles are then secured, and the stripper is ready for operation. From now on, the stripper should, and must, no longer be adjusted until the stripping edges are completely worn out.

Said level of prestressing at the factory is selected to be large enough for the pressure-exerting force generated thereby during the first spindle-adjustment operation, and acting vertically in the direction of the belt, to be sufficient for satisfactory cleaning of the belt, that is to say even when the additional distance required for follow-up stressing following the second spindle-adjustment operation has been used up by wear. The second spindle-adjustment operation by the amount given in the operating instructions, for example 20 mm, correspondingly increases the stressing of the torsion spring and the pressure-exerting force thus acting vertically in the direction of the belt. This additionally applied spring stressing slowly dissipates again as the lamellae gradually wear out. If the 20 mm has been used up, the module is positioned on the inner stop again and the lamella butts in a pressure-free state against the belt.

It is an essential feature of the stripper that the belt-stripper modules have to be designed such that they always function satisfactorily even during return movement of the belt. This is due to the ratio of the horizontal distance between the axis 11 and the stripping edge 5 and of the vertical distance between the axis 11 and the belt or the stripping edge 5. This ratio always has to be larger than the coefficient of friction between the belt and the material of the stripping edge. Since this ratio only increases during the second operation of raising the system carrier upward on spindles, the minimum ratio can be set at the factory. For typical use cases, this is at least 0.7.

As operation continues, the individual belt-stripper modules will reach their wear limit at different times. Despite the height adjustment of the base part by up to 20 mm, however, there is no risk to the belt, since the fixed stop, formed from the stop nose 13 and stop disk 14, reliably prevents this, irrespective of the height adjustment of the base. An electronic angle of rotation measurement on display 24, is provided to measure the axis of rotation of the first articulation 11 preferably a transmitter 25 is provided to that a remote receiver 26 can provide an angle of rotation measurement display 27 to a remote relocated service station or measure station as illustrated in FIG. 4.

LIST OF DESIGNATIONS

1 Base
2 Stripping body
3 Cutting-edge carrier
4 Stripping lamella
5 Stripping edge
6 Bushing
7 First articulation
8 Height-adjusting means
9 Spring-angle-measuring means
10 Fixed stop
11 Axis of rotation of the first articulation
12 Axis of rotation of the second articulation
13 Stop nose
14 Stop disk
15 Square socket
16 Rubber torsion spring
17 Plastic ring
18 Arrowhead
19 Scale
20 Adjusting ring
21 System carrier
22 Seal
23 Rubber ring
24 Electronic angle of rotation
25 Transmitter
26 Receiver
27 Remote angle of rotation measurement display

The invention claimed is:

1. A belt-stripper module which is intended for a stripping apparatus for the return region of conveying belts and is mounted as one of a number of such modules on a height-adjustable system carrier, comprising:
  a base, which is fastened on the system carrier,
  a cutting-edge carrier, on which a stripping lamella is fitted,
    wherein a stripping edge is fitted on the stripping lamella, and
    the stripping lamella forms an obtuse angle in relation to the belt, as seen in the running direction,
  a stripping body with an articulation housing having two articulations, in the case of which
    a first articulation, of which the axis of rotation runs transversely to the running direction of the belt, with a torsion spring, which connects the base and stripping body, the torsion spring pushing the stripping lamella towards the belt, applying a prestressing force to the belt, and
    a second articulation with a bushing, in which the cutting-edge carrier is mounted in a rotatable manner, the axis of rotation of said second articulation running longitudinally in relation to the running direction of the belt, and said second articulation orienting the cutting-edge carrier on the running belt such that the stripping edge butts always flatly against the belt, and a height-adjusting mechanism for the belt-stripper module on the base, wherein the first articulation is provided with a spring-angle-measuring mechanism and with a fixed stop for deflection.

2. The belt-stripper module as claimed in claim 1, wherein a first articulation with the fixed stop is configured with a rubber torsion spring with a square socket, on which is fastened a stop disk, which strikes against a stop nose fastened on the articulation housing.

3. The belt-stripper module as claimed in claim 1, wherein the prestressing force is detected by a measuring and sensing mechanism integrated in the respective module, and the differences in prestressing are compensated for by a module-height-adjusting mechanism.

4. The belt-stripper module as claimed in claim 1, wherein the measuring and sensing mechanism is configured in the form of an integrated spring-angle-measuring mechanism in combination with a ring which is rotatable about the axis of rotation of the first articulation, is positioned concentrically on the first articulation, is carried along when the belt stripper swings back, does not swing back again thereafter, and remains in the position of the greatest swinging amplitude reached up until that point.

5. The belt-stripper module as claimed in claim 4, wherein the measuring and sensing mechanism is configured in the form of an integrated spring-angle-measuring mechanism and a rotatable plastic ring with an arrowhead, which indicates the prestressing of the torsion spring on a scale.

6. The belt-stripper module as claimed in claim 5, wherein the rotatable plastic ring is fastened such that it can be rotated in relation to a foam disk or a rubber ring, on which it is seated with slight undersizing, and therefore the plastic ring is secured in its deflected position by the friction between the foam disk, or rubber ring, and plastic ring, even when the module is relieved of stressing again.

7. The belt-stripper module as claimed in claim 1, wherein a device for electronic angle-of-rotation measurement is provided on that side of the module on which the arresting stop is fitted.

8. The belt-stripper module as claimed in claim 7, wherein the device for electronic angle-of-rotation measurement is integrated in a covering cap.

9. The belt-stripper module as claimed in claim 7, wherein the device for electronic angle-of-rotation measurement is provided with a transmitter, by way of which the angle-of-rotation state converted to a signal is transmitted to a receiver located outside the module.

10. The apparatus as claimed in claim 9, wherein the system carrier has fitted on it a receiver which receives the signals transmitted by the belt-stripper modules and evaluates said signals in an evaluation unit.

11. The apparatus as claimed in claim 10, wherein the evaluation unit is connected to an indicating device.

12. The apparatus as claimed in either of claim 10, wherein the evaluation unit is provided with a transmitter, by way of which the data or values determined are transmitted to a further-removed service station or a measuring station.

13. A method of striping debris from a conveyor belt return, comprising:
installing a belt-stripper module as claimed in claim 1 on a conveyor system carrier with a height-adjustable mechanism in order to strip a return region of a conveying belt.

14. The method of installing and adjusting belt-stripper modules as claimed in claim 1, comprising the following operating steps:
(i) the stripper is moved toward the belt, by displacement of the system carrier, until the first module is in contact with the belt, setting one or more slave pointers of the angle-measuring device back as far as the fixed stop;
(ii) from this position, the stripper is prestressed by a further distance in relation to the belt by the displacement of the system carrier, the height position of the carrier-displacement mechanism is marked;
(iii) the system carrier with the modules is moved back again from the belt and removed;
(iv) the positioning of the slave pointers can now be used to show whether all the modules have optimum desired level of prestressing;
(v) if the prestressing of a module does not correspond to the stipulated requirements, the module is adapted via the height-adjusting mechanism of the base part of the module;
(vi) following the height adjustment of the modules, the slave pointers are zeroed again and the stripper is prestressed in relation to the belt again until the position from step (ii) has been reached again.

15. A method of operating an evaluation unit as claimed in claim 7, comprising;
determining which module is most worn and is the least advantageous for the remaining operating period, and emitting one of three values:
a first value for unrestricted continued operation,
a second value for maintenance being required, and
a third value for the case where the end stop has been reached and there is no longer any stripping action taking place.

* * * * *